US011454716B2

(12) United States Patent
Emadi et al.

(10) Patent No.: US 11,454,716 B2
(45) Date of Patent: Sep. 27, 2022

(54) SYSTEMS AND METHODS FOR ADAPTIVE GATING IN INITIALIZATION OF RADAR TRACKING

(71) Applicant: Woven Planet North America, Inc., Los Altos, CA (US)

(72) Inventors: Mohammad Emadi, San Jose, CA (US); Jamaledin Izadian, San Jose, CA (US); Ali Mostajeran, San Jose, CA (US); Renyuan Zhang, Milpitas, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 263 days.

(21) Appl. No.: 16/730,759

(22) Filed: Dec. 30, 2019

(65) Prior Publication Data
US 2021/0199792 A1 Jul. 1, 2021

(51) Int. Cl.
*G01S 13/64* (2006.01)
*G01S 13/72* (2006.01)
*G01S 13/931* (2020.01)

(52) U.S. Cl.
CPC ............ *G01S 13/64* (2013.01); *G01S 13/723* (2013.01); *G01S 13/931* (2013.01)

(58) Field of Classification Search
None
See application file for complete search history.

(56) References Cited

U.S. PATENT DOCUMENTS

| 4,156,875 A | 5/1979 | Keane | |
|---|---|---|---|
| 6,133,997 A * | 10/2000 | Yamawaki | B64G 1/1085 250/203.3 |
| 6,215,438 B1 * | 4/2001 | Oswald | G01S 13/931 342/28 |

(Continued)

FOREIGN PATENT DOCUMENTS

CN 108490429 B 5/2019

OTHER PUBLICATIONS

United States Patent and Trademark Office, International Search Report and Written Opinion for PCT/US2020/067031, dated Apr. 1, 2021.

*Primary Examiner* — Marcus E Windrich
(74) *Attorney, Agent, or Firm* — Christopher G. Darrow; Darrow Mustafa PC

(57) ABSTRACT

Systems, methods, and non-transitory computer-readable media provide an adaptive gating mechanism for radar tracking initialization. Specifically, the radar system obtains measurement data of target points, and then determines, based on the measured position and dopplers of points in the first few scans, whether the doppler and displacement parameters satisfy an initialization constraint. When the initialization constraint is not satisfied, the radar system flags the respective cluster with an initialization flag, and adaptively uses the measured position and doppler of scanned points to determine the gating size for the next scan, instead of using a fixed gate size. When the initialization flag of the same cluster across a few consecutive scans satisfies a combination logic, the radar system determines that the tracking enters into the association stage, e.g., the radar system formally generates a track for the target points along a series of scans.

20 Claims, 14 Drawing Sheets

(56) References Cited

U.S. PATENT DOCUMENTS

| | | | | |
|---|---|---|---|---|
| 6,680,689 B1* | 1/2004 | Zoratti | ................... | B60Q 9/008 |
| | | | | 340/436 |
| 2002/0147534 A1* | 10/2002 | Delcheccolo | ......... | G01S 13/343 |
| | | | | 342/72 |
| 2011/0313665 A1* | 12/2011 | Lueke | ................... | G01S 13/931 |
| | | | | 701/301 |
| 2013/0035880 A1 | 2/2013 | Hoferer | | |
| 2020/0142026 A1* | 5/2020 | Bush | .................... | G01S 13/931 |

* cited by examiner

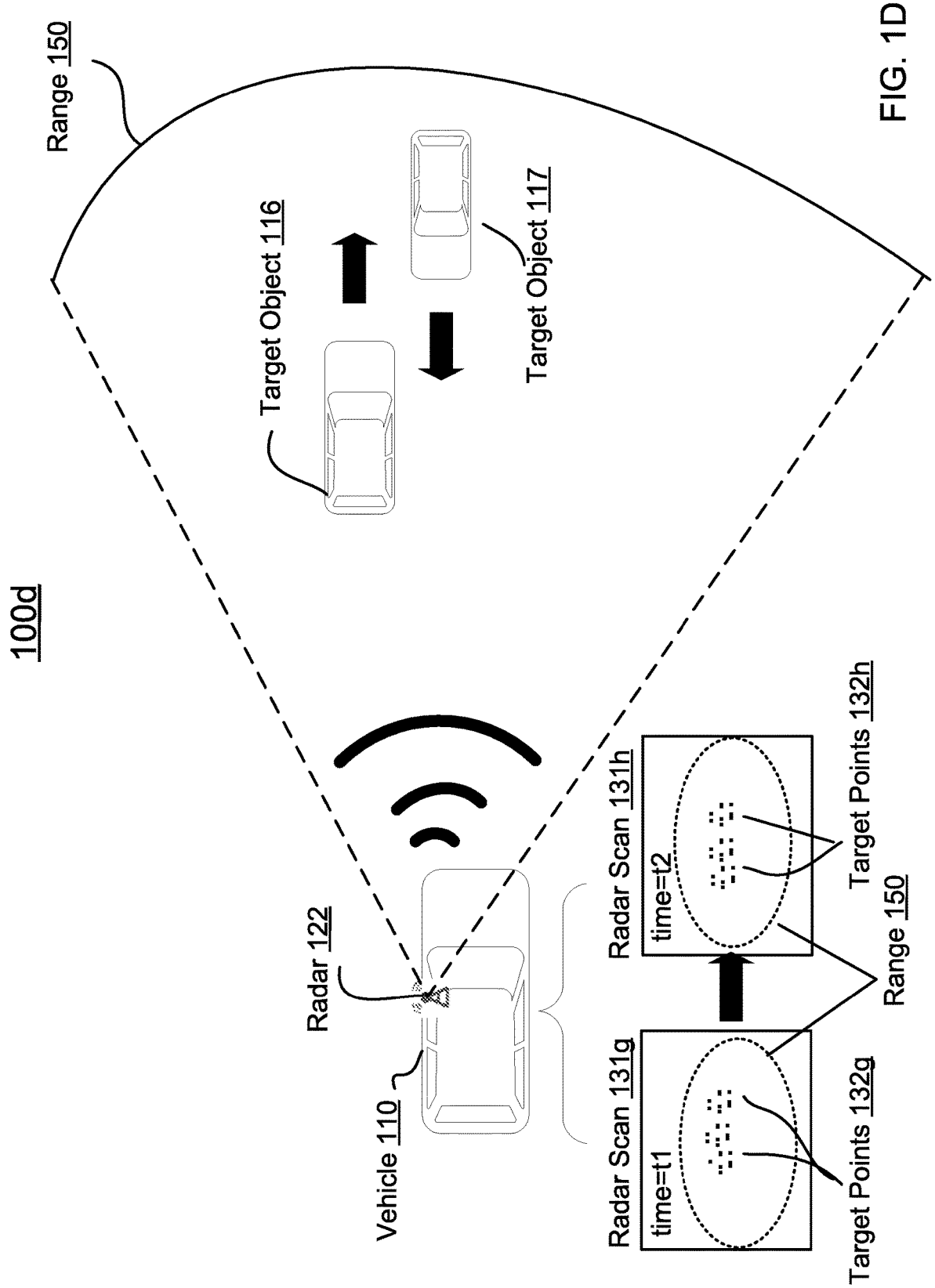

SYSTEMS AND METHODS FOR ADAPTIVE GATING IN INITIALIZATION OF RADAR TRACKING

FIELD OF THE INVENTION

The present technology relates to vehicle systems and navigation systems. More particularly, the present technology relates to systems, apparatus, and methods for adaptive gating in initialization of radar tracking.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may be installed with a radar unit, along with other sensors such as an inertial measurement unit (IMU), which provides measurement data of objects in the environment that the vehicle is situated at such that the vehicle can make or assist a human driver to make a navigation decision.

Specifically, the radar system is usually configured to scan a three-dimensional space characterized by a radius range, an azimuth angle, and a polar angle, known as radar gating. Traditionally, as the vehicle is moving, the radar system is configured to generate radar scans within a fixed gating range, e.g., a fixed radius range=50 m, 60 m, etc. The fixed radar gate, however, sometimes may miss the target, e.g., when the target is moving very fast relative to the vehicle associated with the radar system, such that the target may run out of the range of the fixed radar gate of the radar system at the next time point when a radar scan is taken. Thus, the radar system may miss the observation of the target and fail to generate an accurate tracking trajectory of the target. In particular, during an initialization stage of radar tracking when multiple clusters of target points are captured from radar scans but have not been associated with a specific track yet, such missed observations or other inaccurate information of target points may yield unreliable tracking trajectories of targets.

SUMMARY

In view of the need for an accurate tracking initialization mechanism for vehicles, an adaptive gating mechanism for radar tracking initialization is provided. For example, the radar system obtains measurement data of target points, and then determines, based on the measured position and Doppler velocities of points in the first few scans, whether the doppler and displacement parameters satisfy an initialization constraint. When the initialization constraint is not satisfied, the radar system flags the respective cluster with an initialization flag and adaptively uses the measured position and doppler of scanned points to determine the gating size for the next scan, instead of using a fixed gate size. When the initialization flag of the same cluster across a few consecutive scans satisfies a combination logic (e.g., 2 consecutive valid clusters, etc.), the radar system determines that the tracking enters into the association stage, e.g., the radar system formally generates a track for the target points along a series of scans. At the association stage where the tracked cluster movement is relatively more stable than the initialization stage, the radar system may replace a measurement-based gate size with a computed Mahalanobis distance based on a Kalman filter output for the gate size in order to save sensor power and resource. In this way, by using measurement-based adaptive gating in the initialization stage, the radar system can accurately determine when to switch from an initialization stage to an association stage of radar tracking and thus improve the reliability radar tracking of target objects.

Various embodiments of the present technology can include systems, methods, and non-transitory computer readable media configured to initialize a track of target points over sensor data scans using adaptive gating. Sensor data relating to at least one target point may be captured at a first time using a first gating size, while the vehicle is traveling along a route. A first movement parameter associated with the one target point may be determined from the sensor data. It is then determined whether a tracking initialization condition is satisfied based at least in part on the first movement parameter. In response to determining that the tracking initialization condition is not satisfied, a second gating size is adaptively determined based at least in part on the first movement parameter. Additional sensor data may be captured by the sensor unit at a second time using the second gating size.

In some embodiments, a first set of coordinates representing a first location of the one target point at the first time are determined. A first Doppler velocity representing a velocity that the one target point is traveling may also be determined at the first time.

In some embodiments, a previously stored set of coordinates representing a prior location of the one target point are retrieved at a time prior to the first time, and a previously stored Doppler velocity representing a velocity that the one target was traveling at the time prior to the first time is retrieved.

In some embodiments, a displacement between the first location and the prior location is computed based on the first set of coordinates and the previously stored set of coordinates. A Doppler change may be computed based on a difference between the first Doppler velocity and the previously stored Doppler velocity. A weighed sum of the displacement and the Doppler change may be computed as the second gating size.

In some embodiments, the system may determine whether the computed displacement is less than or equal to a sum of the first Doppler velocity weighted by a first pre-defined constant and a second pre-defined constant.

In some embodiments, the system may determine whether the computed Doppler change is less than or equal to a third pre-defined constant.

In some embodiments, in response to determining that the tracking initialization condition has been satisfied for a series of sensor data captured at a minimum number of consecutive times including the first time, or that the tracking initialization condition has been satisfied for at least a minimum percentage of sensor data captured during a period of time including the first time, the system may determine that an initialization stage is completed, an monitor the at least one target point starting from the second sensor data to form the track of target points.

In some embodiments, in response to determining that the initialization stage is complete, the second gating size may be computed based on an Kalman filter output.

In some embodiments, the second gating size may be computed based on the Kalman filter output by computing a likelihood distance matrix of a plurality of distance metrics, and generating an elliptical gate based on the likelihood distance matrix and a first Doppler velocity at the first time for capturing the second sensor data.

In some embodiments, in response to determining that the tracking initialization condition is not satisfied for at least a maximum number of consecutive times, the initialization of the track is terminated.

In some embodiments, the track of target points may be terminated in response to determining that an observation of a predicted target point has been missed from the generated elliptical gate for at least a minimum number of consecutive times.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIGS. 1A-1D are block diagrams illustrating various scenarios of an example overview of a vehicle scanning surrounding objects using its radar unit in order to generate tracking trajectories of target objects in the environment, while the vehicle is traveling along a route, according to an embodiment of the present technology.

Figure 1A:
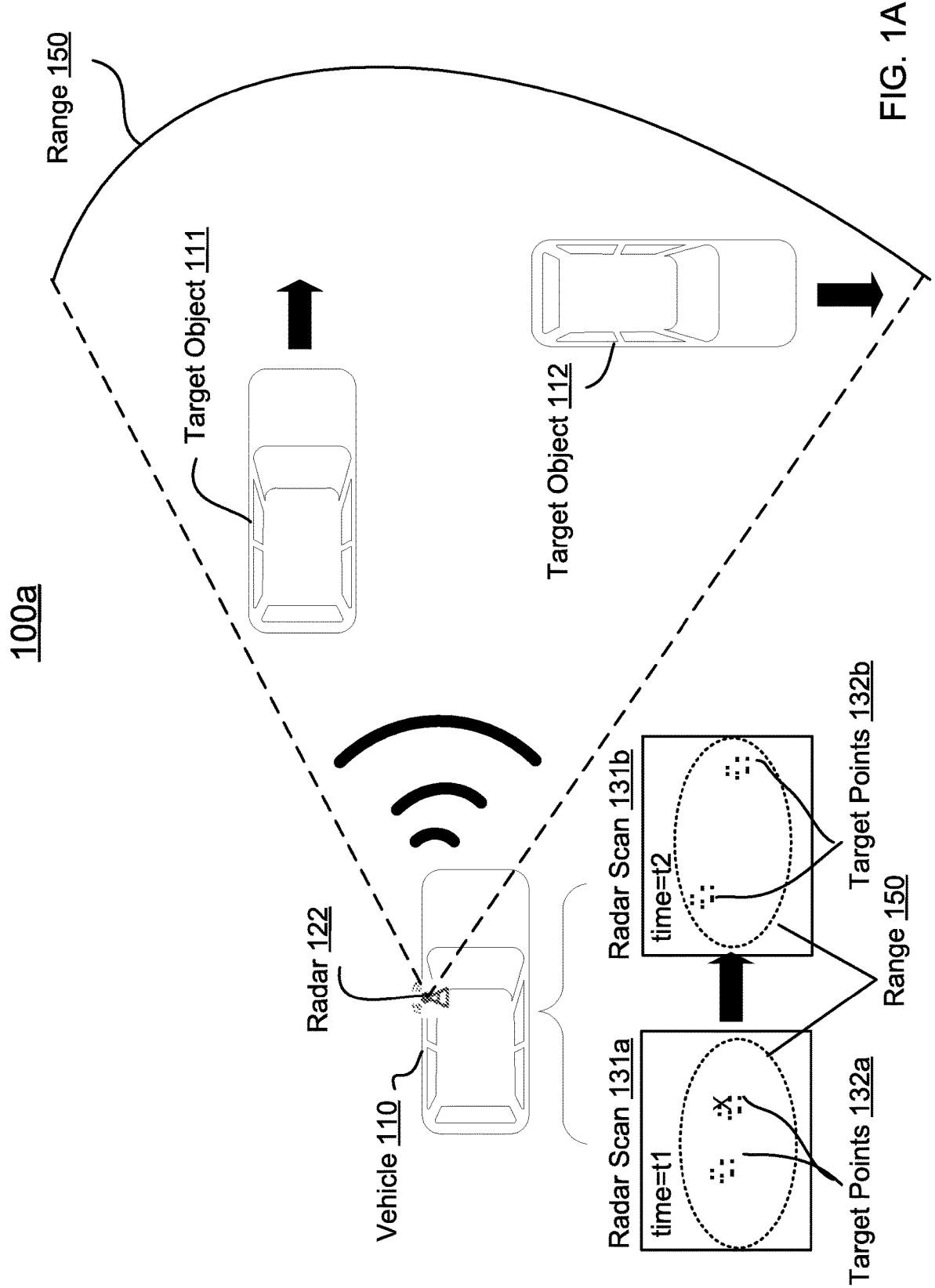

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may be installed with a radar unit, along with other sensors such as an inertial measurement unit (IMU), which provides measurement data of objects in the environment that the vehicle is situated at such that the vehicle can make or assist a human driver to make a navigation decision.

Specifically, the radar system is usually configured to scan a three-dimensional space characterized by a radius range, an azimuth angle, and a polar angle, known as radar gating. Traditionally, as the vehicle is moving, the radar system is configured to generate radar scans within a fixed gating range, e.g., a fixed radius range=50 m, 60 m, etc. The fixed radar gate, however, sometimes may miss the target in various scenarios, e.g., when the target is moving very fast such that the target may run out of the range of the fixed radar gate at the next time point, when the target is moving very slow such that a relatively large fixed gating size may cause the system to associate surrounding clutter to be mistaken as part of the track of the target, etc.

FIGS. 1A-1D are block diagrams illustrating various scenarios of an example overview of a vehicle scanning surrounding objects using its radar unit in order to generate tracking trajectories of target objects in the environment while the vehicle is traveling along a route. Diagram 100a in FIG. 1A shows a scenario where vehicle 110 is traveling along a route, which is equipped with a radar unit 122 (e.g., on a top panel of the vehicle 110). The radar unit 122 is configured to emit radio waves that are reflected back to the radar unit 122 from target objects 111-112 (e.g., moving vehicles, etc.) within a radar range, e.g., referred to as a range gate 150. The size of the range gate 150 may be described by a range radius.

As the target objects 111 and 112 are moving, the radar unit 122 is configured to generate radar scans 131a-b based on reflections from the target objects 111-112 at different time stamps, periodically, intermittently or constantly, e.g., every 50 ms, etc. For example, the radar scans 131a-b illustrate target points 132a-b captured within the radar range 150, which may be defined by the radar system as clusters, each indicating a position of the target objects 111-112 at different time stamps t1 and t2, respectively. The radar data obtained by the radar unit 122 may include the location (e.g., coordinates) of the target points and the Doppler velocity of the target points at each timestamp.

In this way, the radar scans 131a-b at different timestamps may be used to associate clusters 132a-b to generate tracking trajectories of the target object 111-112.

Figure 1B:
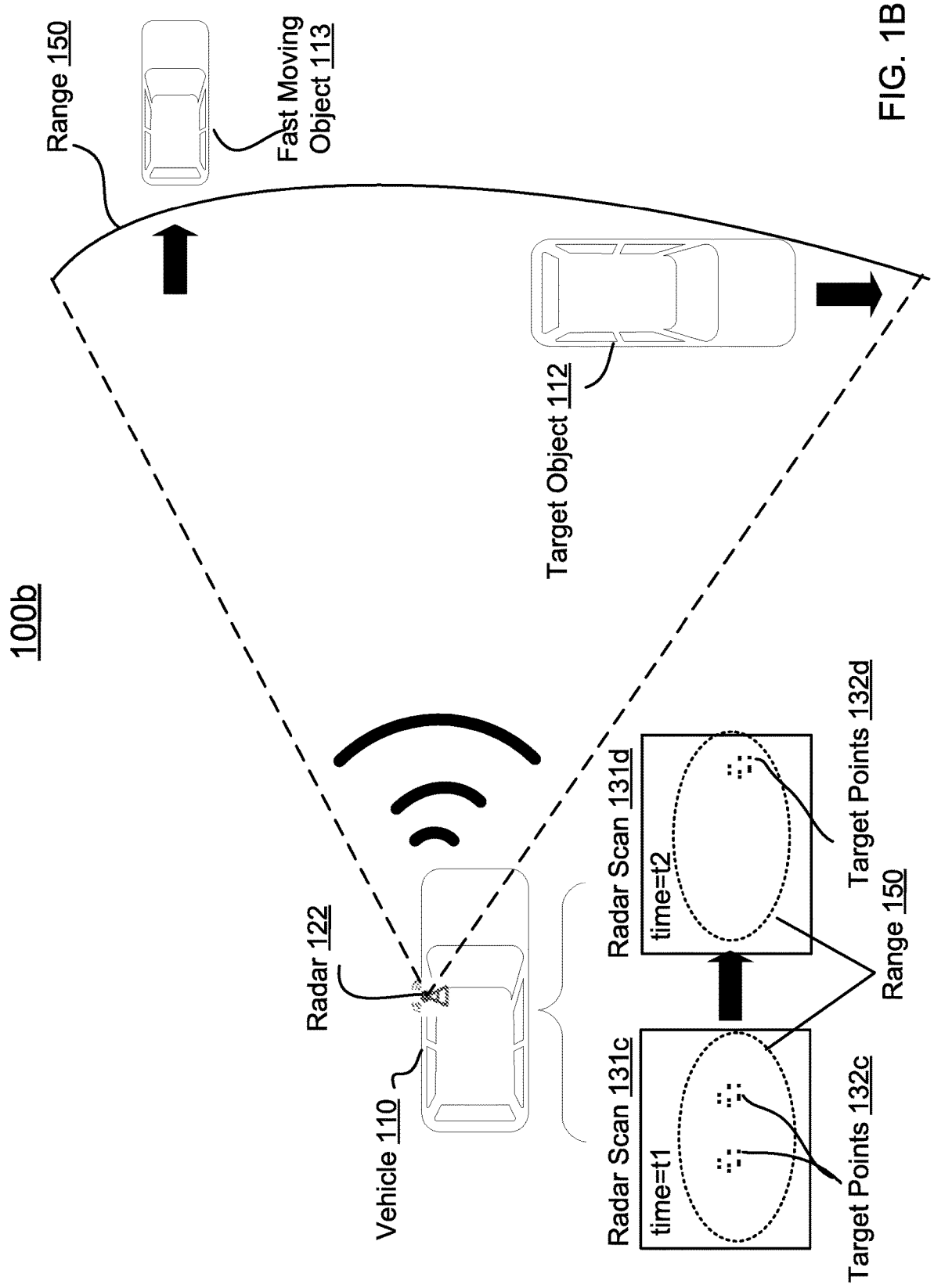

Traditionally, the size of the range gate 150 may be determined empirically, and a fixed gating size may be used for the range gate 150, e.g., 50 m, 60 m, etc. Diagram 100b in FIG. 1B shows a scenario where a range gate 150 having a fixed gating size not large enough for a fast-moving object 113 may miss tracking the fast-moving object 113. When a target object 113 (e.g., a high-speed vehicle, etc.) is moving at high speed, the track of the target object may contain only sparse target points along the track. In this case, when the radar unit 122 uses a fixed gating size to scan the surrounding objects 112-113 at fixed timestamps t1 and t2, the resulting radar scans 131a-d may miss observation of a target point representing the fast-moving object 113. For example, at time t1, the radar scan 131c may contain target points 132c representing both the object 113 and object 112. At time t1, if the object 113 is moving at high speed (e.g., much greater than the speed that vehicle 110 is traveling at) but the radar unit 122 engages a fixed gating size (not large enough) to scan the surrounding objects, at time t2, the fast-moving object 113 may have moved out of the range gate 150. Thus, radar unit 122 may not be able to detect object 113 at time t2, resulting in radar scan 131d showing target points 132d representing target object 112 only but missing information of object 113.

Figure 1C:
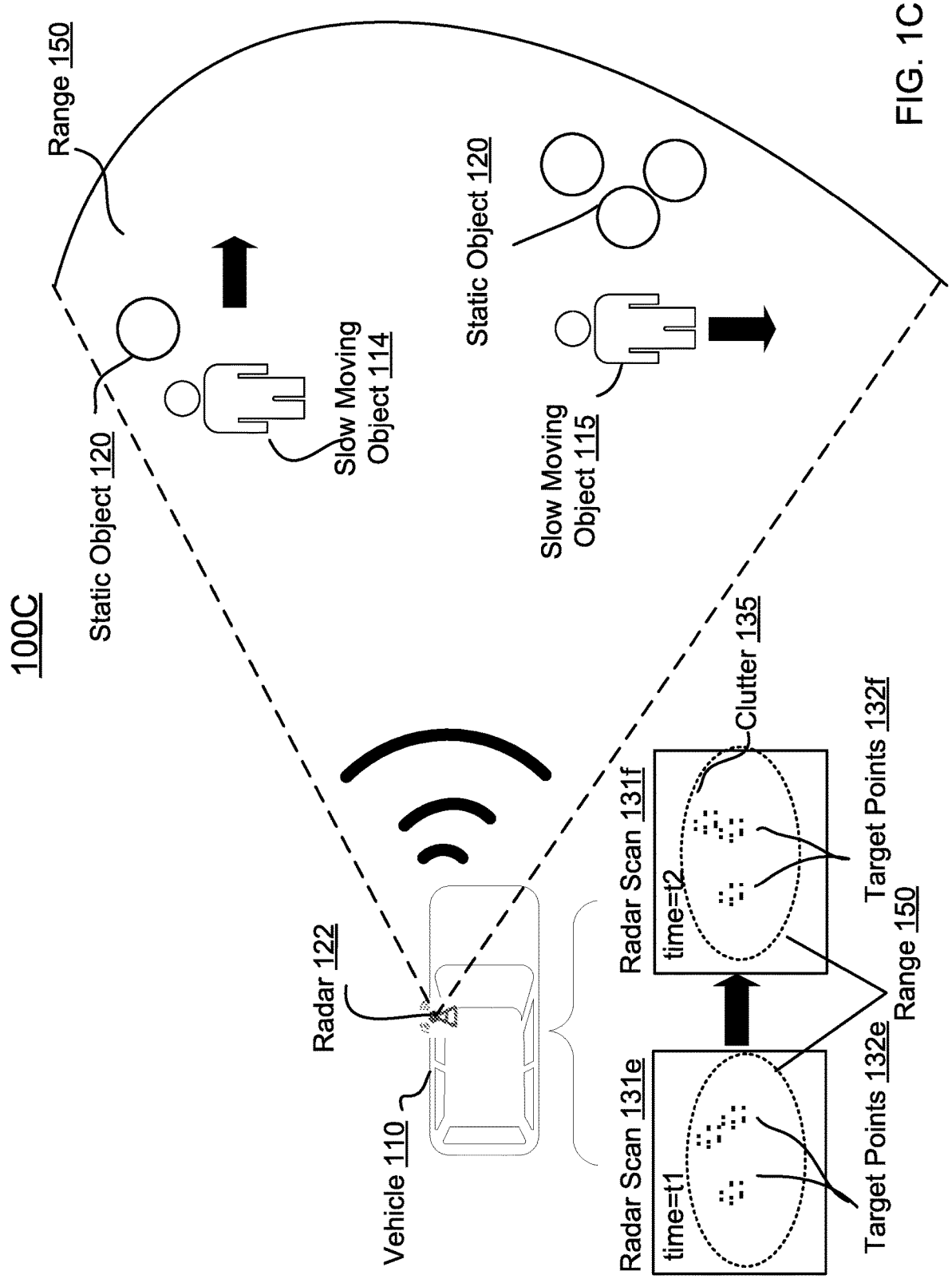

Diagram 100c in FIG. 1C shows a scenario where a radar range 150 having a fixed gating size too large for slow-moving objects 114-115 may cause the track of the slow-moving objects 114-115 to be mistakenly associated with surrounding clutter of static objects 120. When target objects 114-115 are moving at a low speed (e.g., much slower than the speed vehicle 110 is traveling at), the difference of location change, e.g., the displacement vector, of the objects 114-115 between time t1 and t2 can be rather trivial. In this case, when the radar range 150 uses a large gating size, the target points representing the slow-moving objects 114-115 may often be mingled with clutter points representing static objects 120 in the surroundings. For example, radar scan 131e shows the target points 132e mingled with clutter points at time t1, which is similar to the target points 132f mingled with clutter points 135 at time t2. Thus, the clutter points 135 may be mistakenly associated with target points 132e-f as part of the track of slow-moving objects 114-115.

Diagram 100d in FIG. 1D shows a scenario where a radar range 150 having a fixed gating size too large for objects 116-117 moving towards each other may end up obtaining many target points moving along the same track, which is difficult to distinguish separate tracks for the objects 116-117. For example, target object 116 and 117 may be traveling towards each other along a substantially similar route. At time t1 and t2, using a fixed gating size, the radar unit 122 may obtain the radar scans 131g-h, each of which captures a set of target points along the same track representing the target object 116 and 117. As such, it may be difficult for the vehicle 110 to distinguish separate tracks of the target objects 116 and 117.

Thus, as shown in diagrams 100b-d, when radar unit 122 starts to scan the surrounding objects, using a fixed gating size may lead to inaccurate tracking as radar unit 122 may often miss the target point when the fixed gating size is not large enough, confuse the target point with clutter when the fixed gating size is too large, or unable to distinguish separate tracks for different targets. In view of the need for a tracking mechanism for vehicle 110 to obtain accurate and robust tracking trajectories of surrounding objects, an adaptive gating mechanism for radar tracking initialization is provided as described herein.

Figure 2A:
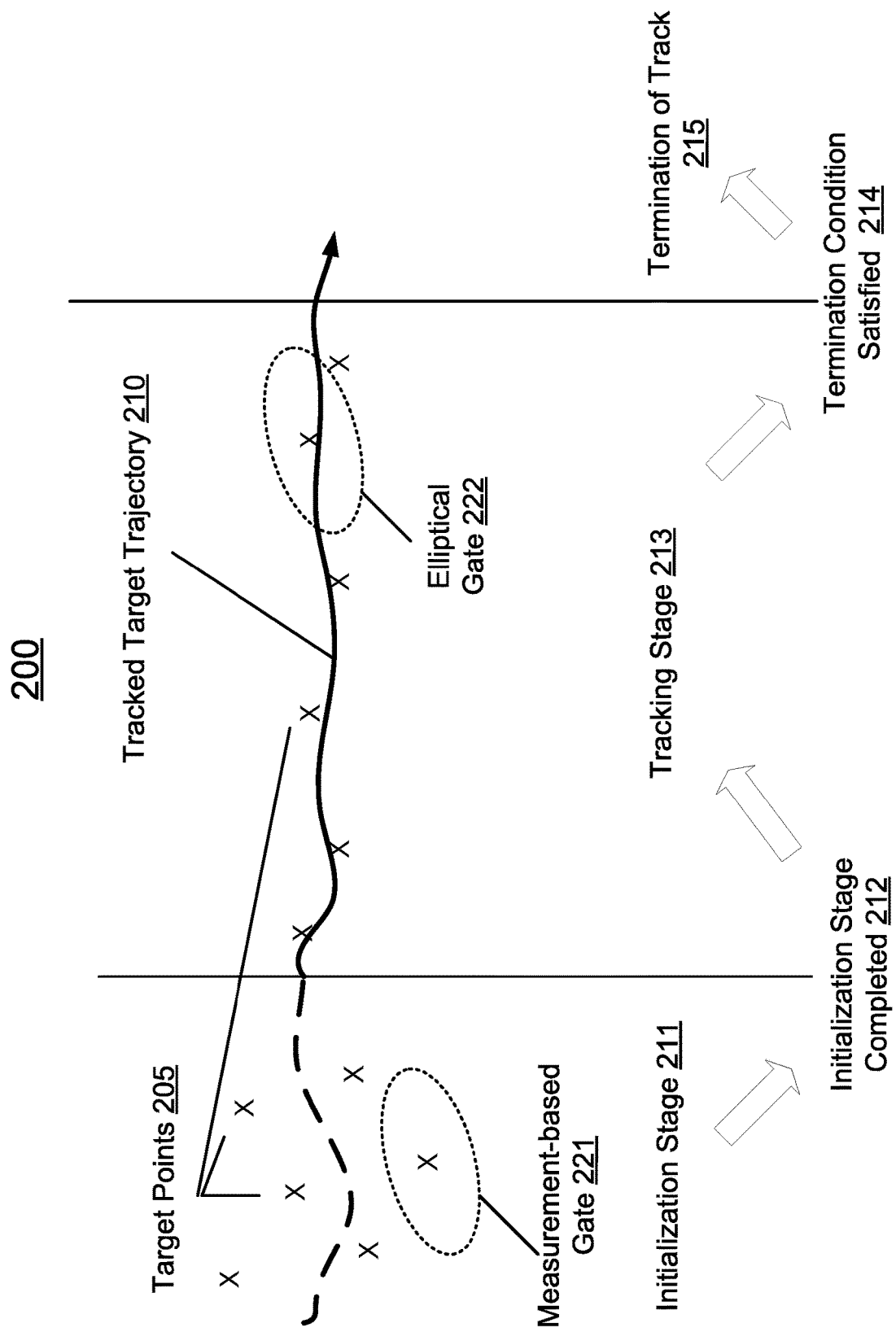
FIGS. 2A-2B are block diagrams illustrating different stages of generating a tracking trajectory of a target point, according to an embodiment of the present technology.

FIG. 2A is a block diagram illustrating different stages of generating a tracking trajectory of a target point, according to an embodiment of the present technology. Diagram 200 shows a tracked target trajectory 210, which represents the movement trajectory of a target object that the radar unit is tracking. The tracked trajectory 210 is obtained by tracking the target points representing the target object from various radar scans (e.g., 131a-f shown in FIGS. 1A-1D) captured at a series of timestamps.

Specifically, the tracking process may have different stages. For example, when the radar unit starts to scan the surrounding objects and attempts to establish tracking trajectories of possible moving objects around, the radar unit may often analyze the captured radar scans to identify which points from the radar scans may represent a target object that is to be tracked, e.g., referred to as the initialization stage 211 of tracking. Once the initialization stage is completed at 212, the tracking process enters the tracking stage 213, during which clusters of target points are associated with target objects to formulate the tracked trajectory 210 of a target object. When the tracking stage 213 is completed, e.g., when a termination condition is satisfied at 214, the tracking process is terminated at 215. The radar unit may terminate the current track and may optionally continue obtaining radar scans to establish new tracks.

Traditionally, during the tracking process, the gating size is determined based on Kalman filtering output that provides an estimated joint probability distribution of the positions of target points based on prior measurements. However, during the initialization stage 211, insufficient radar data has been accumulated to provide an accurate Kalman filtering output. Embodiments described herein adopt a radar measurement-based gating size 221 for adaptive gating during the initialization. That is, instead of using an empirically computed gating size, the radar system adaptively uses the measured position and Doppler velocity of target points from radar data to determine the gating size for the next scan. For example, if $(x_j, y_j)$ denotes the coordinates of the current location of a target point, $v_{d_j}$ denotes the Doppler velocity of the target point at a current timestamp $t_j$, $(x_{j-1}, y_{j-1})$ denotes the coordinates of a prior location of the target point and $v_{d_{j-1}}$ denotes the Doppler velocity of the target point at a previous timestamp $t_{j-1}$, a Bayesian merit function may be used to compute the gating size at timestamp $t_j$:

$$d_{j|j-1} = \alpha_p \sqrt{(x_j - x_{j-1})^2 + (y_j - y_{j-1})^2} + \alpha_d(v_{d_j} - v_{d_{j-1}}) \qquad (1)$$

where $d_{j|j-1}$ denotes the adaptive gating size for timestamp $t_j$ which is determined based on radar measured position data and Doppler data, $\alpha_p$ is a weighting parameter for the displacement value between timestamps $t_{j-1}$ and $t_j$, and $\alpha_d$ is a weighting parameter for the Doppler change between timestamps $t_{j-1}$ and $t_j$.

The measurement data, including the positions and Doppler velocities of target points, are also used to determine whether the tracking process is completed at 212. For example, the radar unit may determine whether the displacement and the Doppler change between timestamps $t_{j-1}$ and $t_j$ satisfied the following initialization constrains:

$$\begin{cases} \sqrt{(x_j - x_{j-1})^2 + (y_j - y_{j-1})^2} \le \gamma_A v_{d_j} + \gamma_B \\ v_{d_j} - v_{d_{j-1}} \le \gamma_D \end{cases} \qquad (2)$$

where $\gamma_A$, $\gamma_B$ and $\gamma_D$ are pre-defined parameters. When the initialization constraint (2) is not satisfied yet for both the displacement and the Doppler change, e.g., at least one of the inequalities is unsatisfied, the tracking process is considered to be still in the initialization phase 211. When the initialization constraint (2) is satisfied, the tracking process is considered to complete the initialization phase 211 and enters the tracking stage 213.

In some embodiments, the radar unit may determine and monitor how many times the initialization constraint in Eq. (2) has failed to be satisfied. For example, if the Eq. (2) has been failed for a certain number of times, it means the tracking process remains in the initialization stage for a number of timestamps (e.g., 9, 10, 12, etc.). In that case, when the radar unit has been staying in the initialization stage for the maximum number of trying, the radar unit may terminate the tracking to save resources for starting a new track.

Figure 2B:
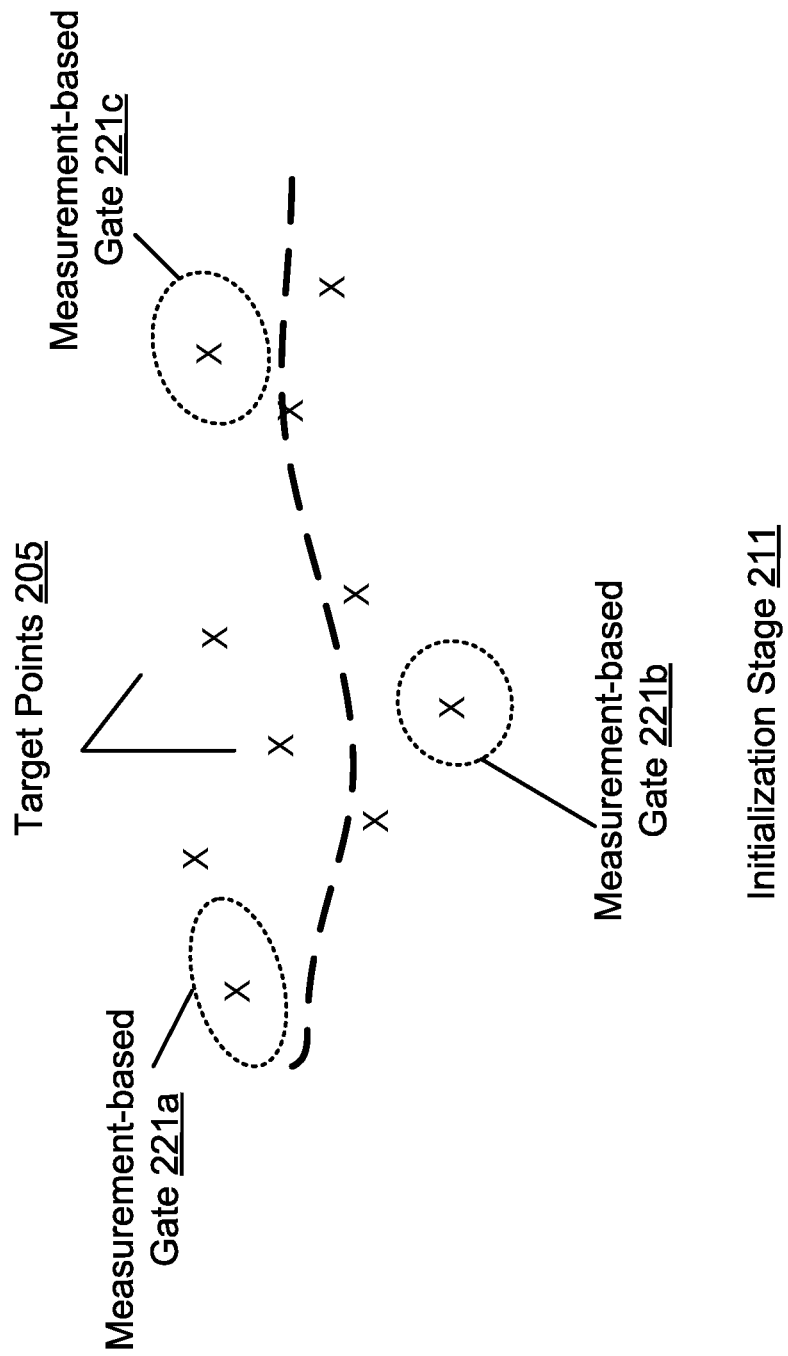

For example, FIG. 2B further illustrates an enlarged view of the tracking process at initialization stage 211. As shown, the measurement-based gates 221a-c may have different sizes determined based on the actual position and Doppler velocity of target points measure by the radar system, respectively.

Referring back to FIG. 2A, once the tracking process enters the tracking stage 213, the gating size may be determined based on a Mahalanobis likelihood distance matrix that is computed from the Kalman filtering output. For example, during the tracking stage 213 when a number of prior radar measurements of the locations and Doppler velocity of the target point is available, the radar unit may employ Kalman filtering to produce a joint probability distribution D predicting possible locations and/or the Doppler velocities of the target points at the next timestamp. Specifically, a Mahalanobis likelihood distance matrix may be calculated based on the joint probability distribution, providing a measure of the distance between the observed location of target points and the distribution D. Thus, a validation gate in the form of an ellipsoid in position and Doppler may be defined by the eccentricity of the data points, which may be calculated as {square root over ((1−b.sup.2/a.sup.2)}, where a is defined by the greater value of the range gate dr and the azimuth gate rd.sub.a (r is the range radius and d.sub.a is the angular gate), and b is defined by the smaller value of the range gate and the azimuth gate. Therefore, the eccentricity is defined and the elliptical gate is applied all over the radar detection points.

During the tracking stage 213, the radar unit may further monitor whether a termination condition is satisfied at 214. For example, when the radar unit fails to locate the target points associated with a track for a minimum number of consecutive timestamps, e.g., 3, 4, 5, etc., the radar unit may consider the track is finished, e.g., the target object may be out of the range. In some embodiments, the radar unit may continue obtaining radar scans for at least a minimum number of timestamps during the tracking stage 213 before determining whether to terminate a track, e.g., at least 5, 6, 7, timestamps, etc.

Figure 3:
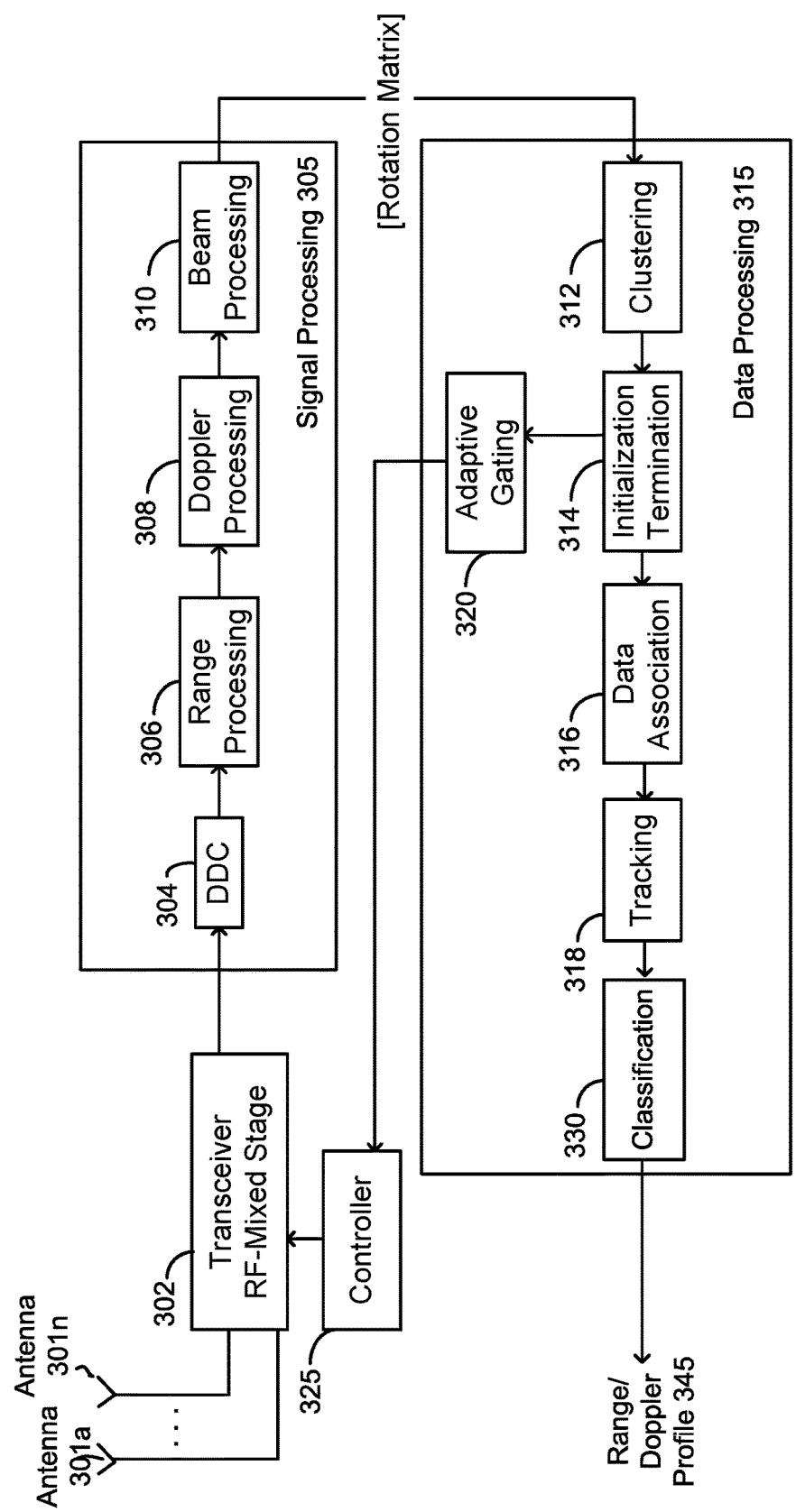
FIG. 3 illustrates an example radar system that may be equipped with a vehicle system, according to an embodiment of the present technology.

FIG. 3 is a block diagram 300 illustrating an example structure of a radar processing unit (e.g., the radar unit 122) at the vehicle 110 shown in FIGS. 1A-1D. The radar processing unit includes a transceiver 302, which is configured to receive, via one or more antennas 301a-n, radio frequency (RF) signals representing reflections from objects in the environment where the vehicle is situated. For example, RF signals reflected from target objects 111-117 as shown in FIGS. 1A-1D may be received at the transceiver 302.

The transceiver 302 is configured to process RF signals at a RF-mixed stage, and then send the processed RF signal to a signal processing block 205, which includes a digital down converter (DDC) 304, which may in turn down sample the processed RF signal for a range processing block 306, which processes and transmits the signal to a doppler processing block 308, where the output signal is transmitted to a beam processing block 310. After signal processing by the signal processing block 305, a rotation matrix may be applied to the output of the signal processing block 305 to formulate a set of raw data points, which are fed to a data processing block 315.

At the data processing block 315, a clustering block 312 is configured to determine a cluster of target points from the raw radar data. An initialization/termination block 314 may determine whether and when the determined cluster is to be tracked as a moving object and when to terminate the tracking. Specifically, the initialization/termination block 314 may provide an initialization indication to the adaptive gating block 320, which may in turn generate an adaptive measurement-based gating size when the tracking is still in an initialization stage based on the initialization indication. The adaptive gating block 320 may send the adaptive gating size to a controller 325, which may control a radar range for radar scanning with the transceiver 302 based on the adaptive gating size.

A data association block 316 may associate clusters of points from radar data captured at different times as representing the same object. A tracking block 318 may track a cluster of points that represents a moving or static object from radar data captured at different times. A classification block 330 may classify the tracked radar data from the tracking block 318, which in turn provides range/doppler profile data 345 of tracked target points. For example, the range/doppler profile data 345 may include the azimuth, range, velocity, coordinates in the inertial coordinate system, coordinates in the radar coordinates of the target, and/or the like.

Figure 4A:
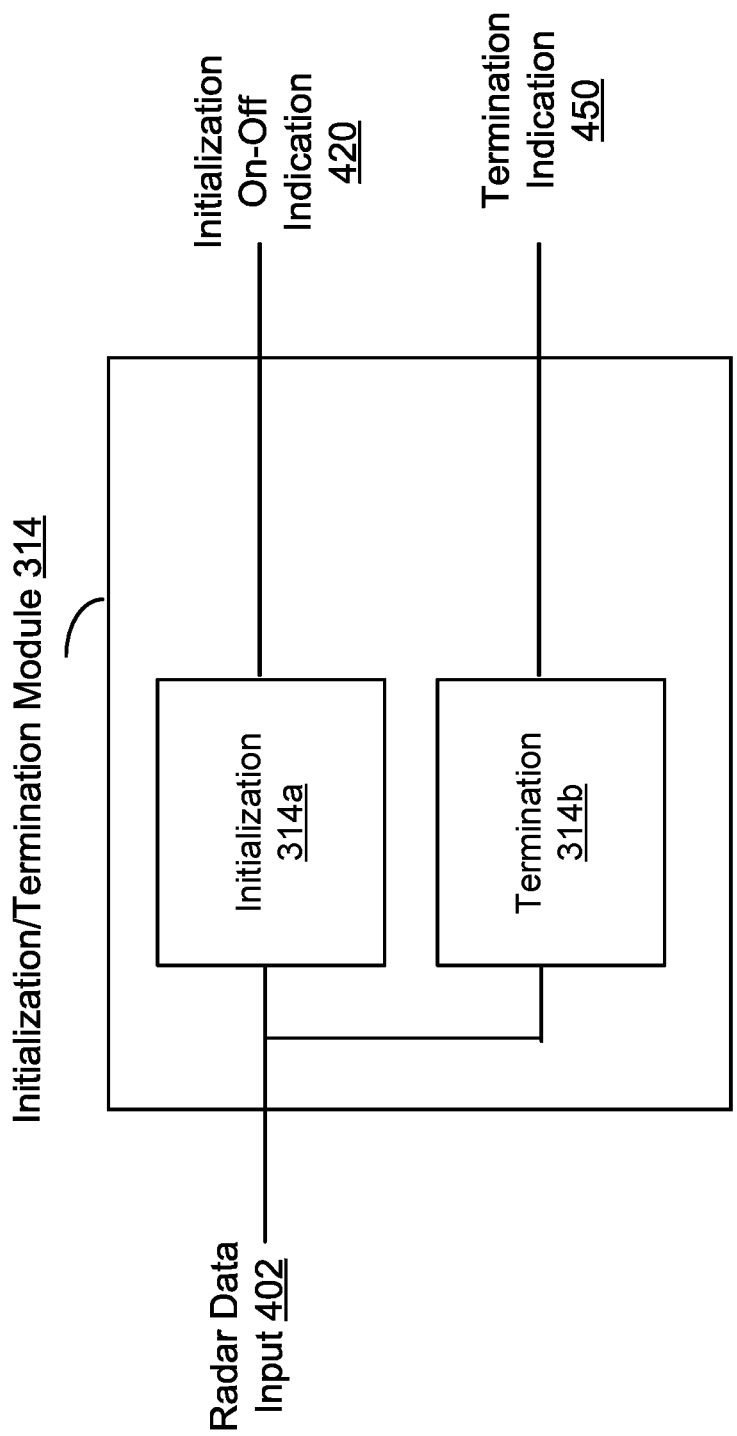
FIGS. 4A-4C illustrate block diagrams of example structures of the initialization/termination module shown in FIG. 3, according to an embodiment of the present technology.
Figure 4B:
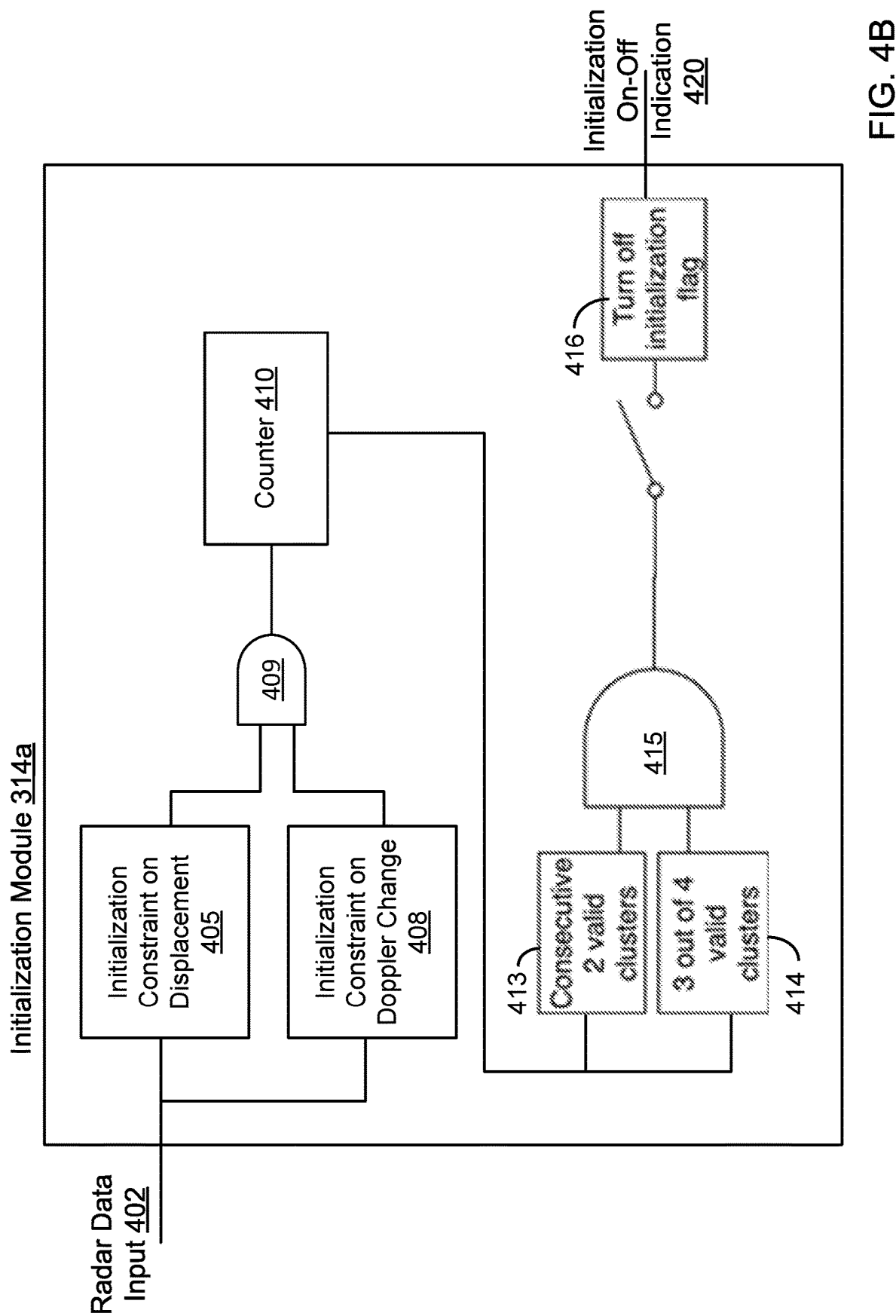
Figure 4C:
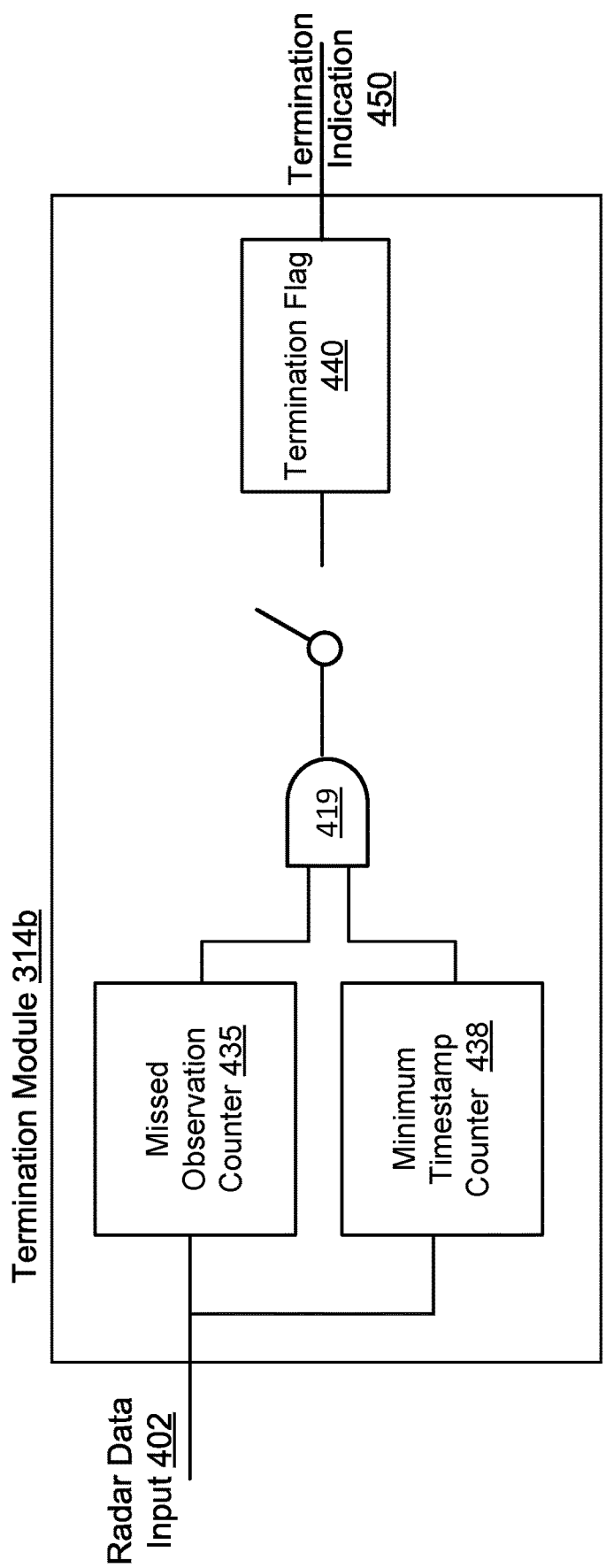

FIGS. 4A-4C illustrate block diagrams of example structures of the initialization/termination module 314 shown in FIG. 3, according to an embodiment of the present technology. As shown in FIG. 4A, the initialization/termination module 314 receives radar data input 402, e.g., data relating to captured target points within the radar range at each time step, and outputs an initialization on-off indication 420, or termination indication 450. For example, when the radar system begins tracking, an initialization module 314a may be used to generate the initialization on-off indication 420 at the initialization stage. When the radar system is at the tracking stage, a termination module 314b may be activated to generate a termination indication 450.

In FIG. 4B, the initialization module 314a may include a circuit for determining an initialization indication based on the initialization constraint shown in Eq. (2). Specifically, the initialization module 314 receives radar data input 402, including measurement of the coordinates (e.g., $(x_j, y_j)$) and the Doppler velocities (e.g., $v_{d_j}$) of target points.

At block 405, the initialization constraint on the displacement of target points is evaluated, e.g., $\sqrt{(x_j-x_{j-1})^2+(y_j-y_{j-1})^2} \leq \gamma_A v_{d_j}+\gamma_B$. The output of block 405, e.g., a true or false binary signal, may be sent to the AND gate 409.

At block 408, the initialization constraint on the Doppler change of target points is evaluated, e.g., $v_{d_j}-v_{d_{j-1}} \leq \gamma_D$. The output of block 408, e.g., a true or false binary signal, may be sent to the AND gate 409. Thus, the AND gate 409 may send a positive signal to the counter 410 when both initialization constraints on displacement and Doppler are satisfied. In this case, the counter 410 may increment by one, and keep track of the total number of instances when the initialization constraints are met.

The counter value and the counting history may be sent to blocks 413 and 414. At block 413, for example, if at least the initialization constraint is satisfied for at least two (or any other pre-defined number) consecutive timestamps, block 413 sends a positive signal to the AND gate 415. At block 414, if the initialization constraint is satisfied for at least a portion of the observed timestamps (e.g., 3 out of 4, 4 out of 5, etc.), block 414 outputs a positive signal to the AND gate 415. In some embodiments, the gate 415 may be an OR gate.

The AND gate 415 may then generate a signal to turn on the switch to turn off the initialization flag 416, e.g., when the initialization constraint is satisfied for at least two consecutive timestamps and/or 3 out of 4 timestamps. When the initialization constraint has not been satisfied for the conditions required by block 413 or 414, the initialization flag may be maintained such that the radar unit remains at an initialization stage. Block 416 may then output an initialization on-off indication 420.

As shown in FIG. 4C, the termination block 314b receives radar data input 402, including measurement of the coordinates (e.g., $(x_j, y_j)$) and the Doppler velocities (e.g., $v_{d_j}$) of target points. The missed observation counter 435 may count the number of times when the radar unit fails to locate the target points associated with a track based on the radar data 402. When the target points are missed for at least a minimum number of consecutive timestamps, e.g., 3, 4, 5, etc., block 435 outputs a positive signal to the AND gate 419. The minimum timestamp counter 438 may count the number of times when radar scans have been conducted since the start of the tracking stage. When radar scans have been conducted for at least a minimum number of timestamps during the tracking stage, block 438 may output a positive signal to the AND gate 419. Thus, when the termination conditions at blocks 435 and 438 are both satisfied, the termination flag block 440 may output a termination indication 450 to end the track.

Figure 5A:
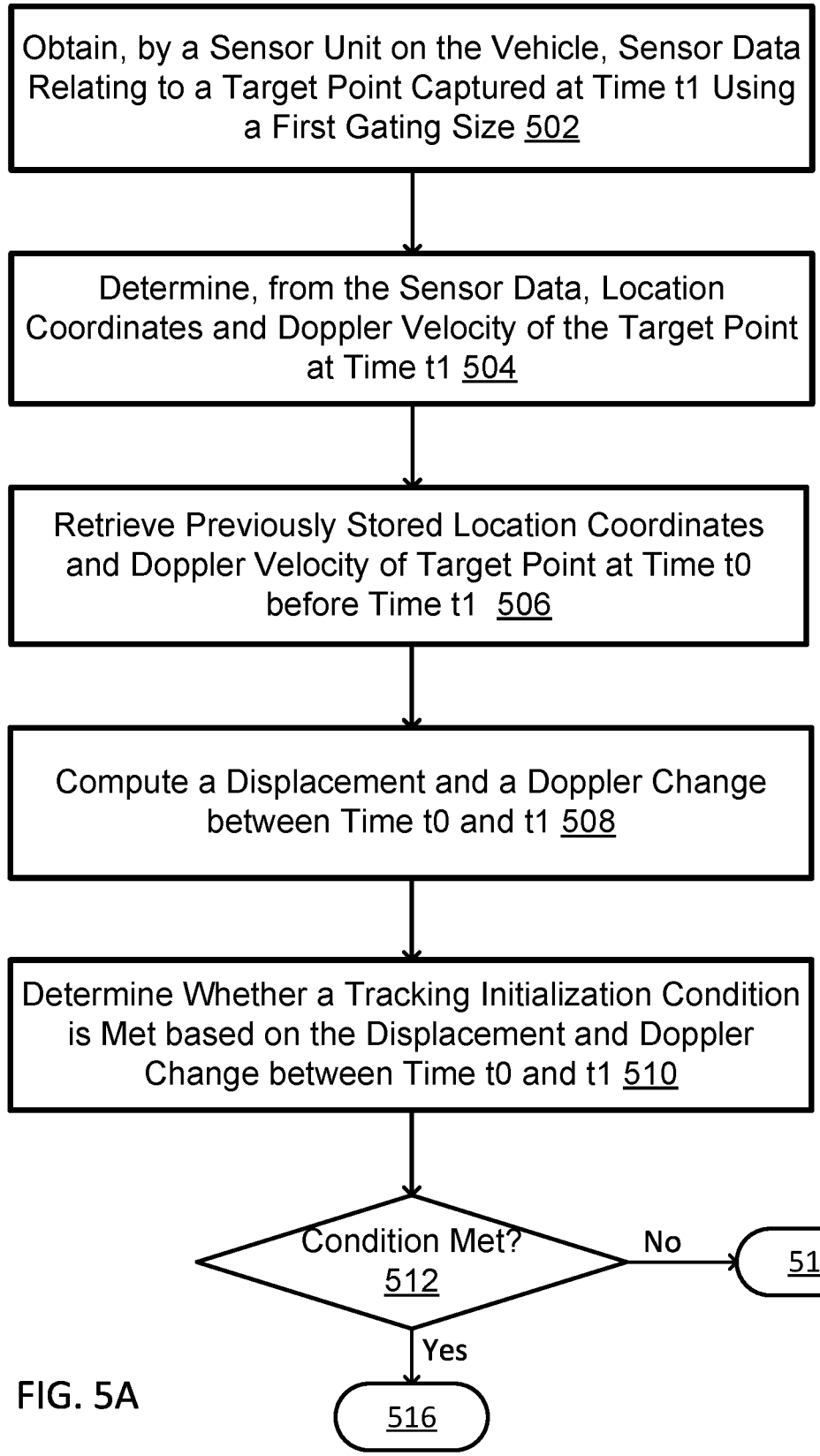
FIGS. 5A-5B is an example logic flow diagram illustrating a method performed by a processing unit on the vehicle to initialize a radar tracking process using adaptive gating and then generate a tracking trajectory using empirical gating, according to an embodiment of the present technology.
Figure 5B:
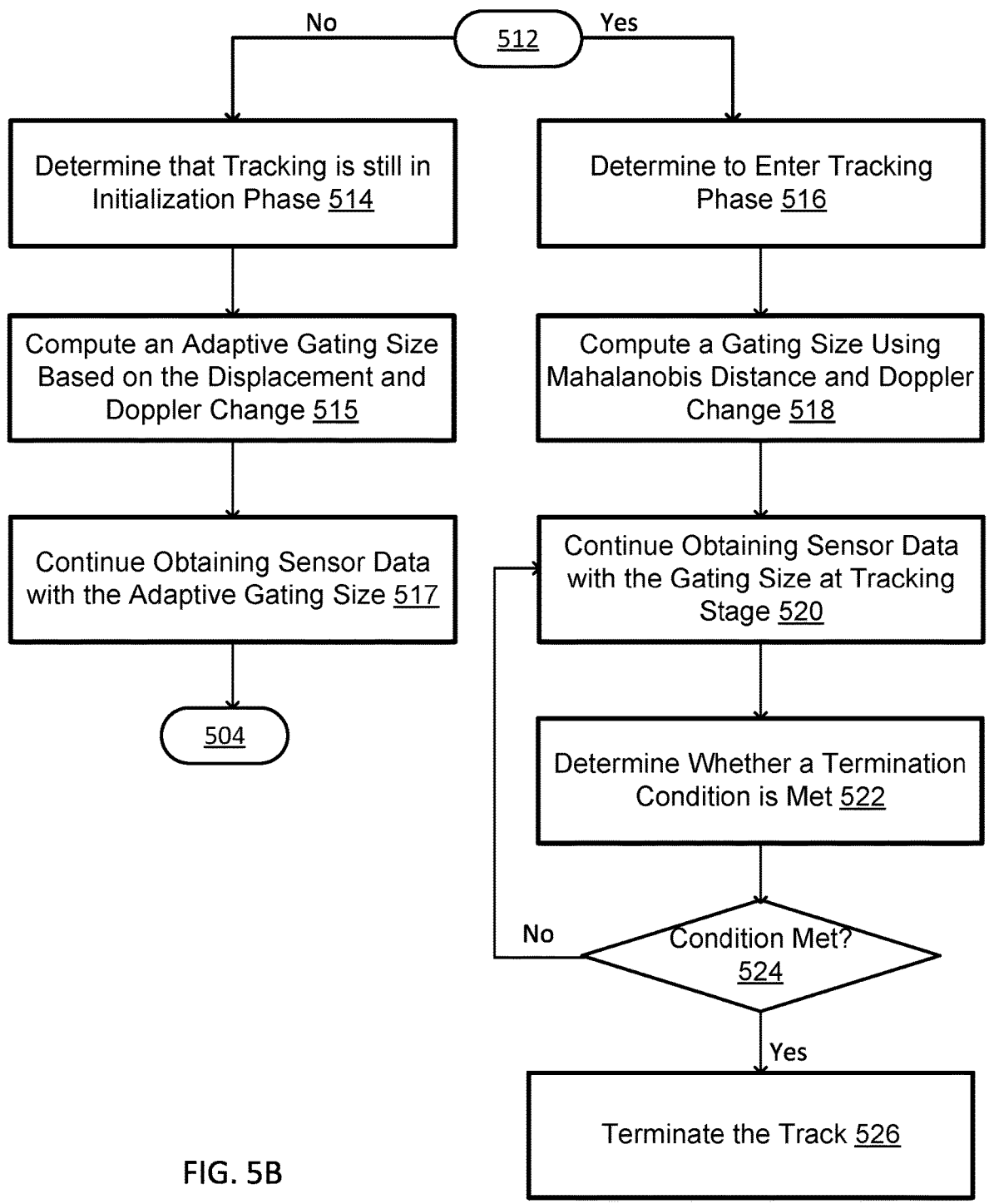

FIGS. 5A-5B is an example logic flow diagram illustrating a method 500 performed by a processing unit on the vehicle to initialize a radar tracking process using adaptive gating and then generate a tracking trajectory using empirical gating, according to an embodiment of the present technology. One or more of the processes or steps 502-526 of method 500 may be implemented, at least in part, in the form of executable code stored on non-transitory, tangible, machine-readable media (e.g., memory 704 and/or storage 706 in FIG. 7) that when run by one or more processors (e.g., processor 702 in FIG. 7) may cause the one or more processors to perform one or more of the processes 502-526. Further, one or more of the processes or steps may be omitted, combined, and/or performed in a different sequence as desired.

At step 502, sensor data relating to a target point is captured by a sensor unit on a vehicle using a first gating size at a first time. For example, radar scan 131a containing target points 132a in FIG. 1A is captured by the radar unit 122 of vehicle 110 at a timestamp t1.

At step 504, the location coordinates and Doppler velocity of the target points are determined from the sensor data. For example, the measurement of the coordinates (e.g., $(x_j, y_j)$) and the Doppler velocities (e.g., $v_{d_j}$) of target points may be determined at timestamp $t_j$.

At step 506, previously stored location coordinates and Doppler velocity of the target points at a previous time may be retrieved. For example, the measurement of the coordinates (e.g., $(x_{j-1}, y_{j-1})$) and the Doppler velocities (e.g., $v_{d_{j-1}}$) of target points from timestamp $t_{j-1}$ may be retrieved.

At step 508, a displacement and a Doppler change between the current timestamp and the previous timestamp is computed. For example, the displacement $\sqrt{(x_j-x_{j-1})^2+(y_j-y_{j-1})^2}$ and the Doppler change $v_{d_j}-v_{d_{j-1}}$ may be computed between timestamps $t_j$ and $t_{j-1}$.

At step 510, the radar unit determines whether a tracking initialization condition is met based on the displacement and Doppler change between the two consecutive timestamps. For example, the radar unit may determine whether the two inequalities in Eq. (2) are both satisfied for the displacement $\sqrt{(x_j-x_{j-1})^2+(y_j-y_{j-1})^2}$ and the Doppler change $v_{d_j}-v_{d_{j-1}}$.

At step 512, when the initialization condition is not met yet, method 500 proceeds to step 514, at which the radar unit determines that the tracking is still in the initialization phase. Then at step 515, an adaptive gating size is computed based on the displacement and Doppler change, e.g., according to Eq. (1). At step 517, the radar unit may continue obtaining sensor data with the adaptive gating size.

At step 512, when the initialization condition is met, method 500 proceeds to step 516, at which the radar unit determines to enter a tracking stage. At step 518, a gating size is computed using Mahalanobis distance and the Doppler change.

At step 520, the radar unit may continue obtaining sensor data with the computed gating size during the tracking stage.

At step 522, the radar unit may determine whether a termination condition is met. For example, the termination module 314 shown in FIG. 4B may determine whether any of the termination conditions is met. At step 524, when the termination condition is met, e.g., the radar unit has missed observations of the target point for at least a minimum number of consecutive scans, and the radar unit has produced a number of scans during the tracking stage, method 500 proceeds to step 526 to terminate the track. Otherwise, when the termination condition is not met yet, method 500 proceeds from step 524 to step 520 to continue obtaining sensor data using the Mahalanobis distance-based gating size.

Figure 6:
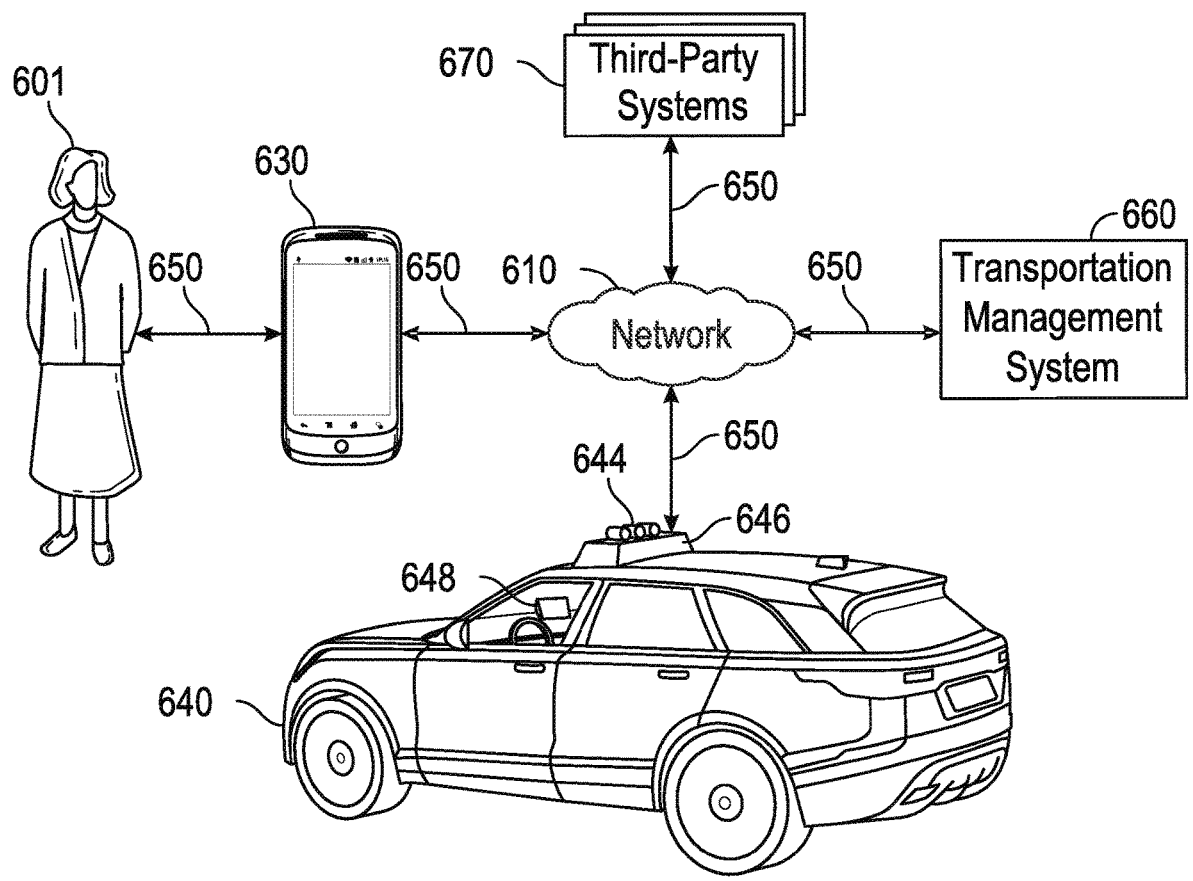
FIG. 6 illustrates an example block diagram of a transportation management environment, according to an embodiment of the present technology.

FIG. 6 illustrates an example block diagram of a transportation management environment for matching ride requestors with vehicles, where the vehicles can use the various embodiments of adaptive gating as described herein. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all of the blocks or modules shown in FIGS. 3 and 4A-4C may be implemented by one or more computing systems of the transportation management system 660. In some embodiments, some or all of the blocks or modules shown in FIGS. 3 and 4A-4C may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE/5G mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
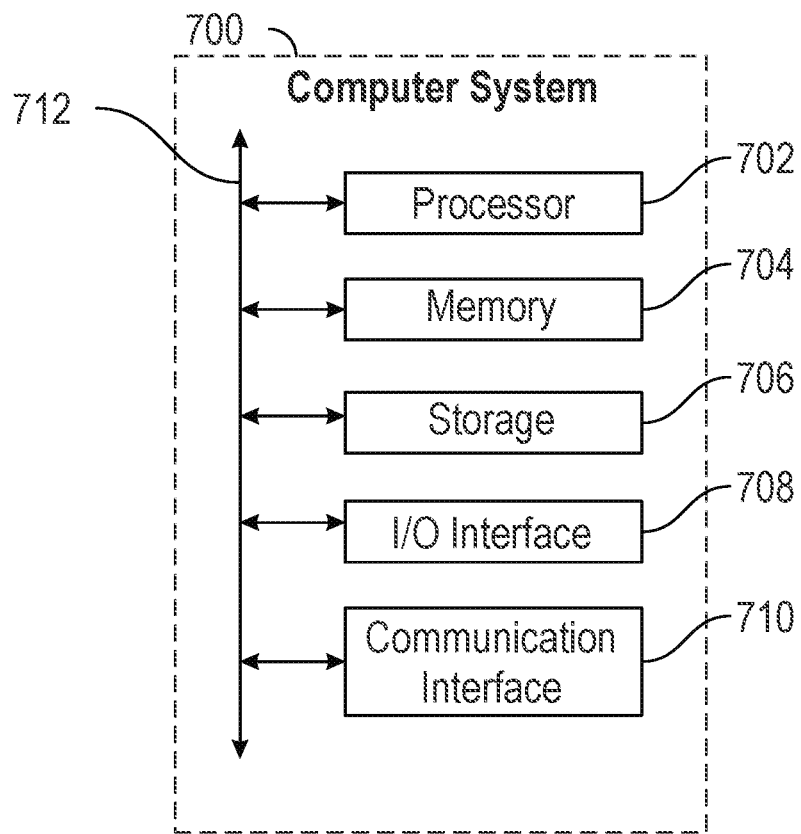
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method of adaptive gating for tracking a target over multiple sensor data scans, the method comprising:
   obtaining, by a sensor unit associated with a vehicle, first sensor data relating to at least one target point captured at a first time using a first gating size;
   determining, from the first sensor data, a first movement parameter associated with the at least one target point;
   adaptively determining a second gating size based at least in part on the first movement parameter, including computing a Doppler change and a displacement for the target point between a first location of a current time step and a prior location from a previous time step to determine a tracking initialization condition that controls whether tracking of the target point may enter an association stage from an initialization stage; and
   obtaining, by the sensor unit, second sensor data captured at a second time using the second gating size.

2. The method of claim 1, wherein adaptively determining the second gating size includes computing the second gating size using the displacement and the Doppler change, wherein the determining the first movement parameter associated with the one target point comprises:
   determining a first set of coordinates representing a first location of the one target point at the first time; and
   determining a first Doppler velocity representing a velocity that the one target point is traveling at the first time.

3. The method of claim 2, wherein the adaptively determining the second gating size based at least in part on the first movement parameter comprises:
   retrieving a previously stored set of coordinates representing a prior location of the one target point at a time prior to the first time, and a previously stored Doppler velocity representing a velocity that the one target was traveling at the time prior to the first time;
   computing the displacement between the first location and the prior location based on the first set of coordinates and the previously stored set of coordinates;
   computing the Doppler change based on a difference between the first Doppler velocity and the previously stored Doppler velocity; and
   computing a weighed sum of the displacement and the Doppler change as the second gating size.

4. The method of claim 1, wherein determining whether tracking enters the association stage includes:
   determining whether the tracking initialization condition is satisfied based at least in part on the first movement parameter by:
   comparing the displacement to a sum of a first Doppler velocity weighted by a first pre-defined constant and a second pre-defined constant.

5. The method of claim 3, further comprising:
   determining whether the tracking initialization condition is satisfied based at least in part on the first movement parameter by:
   determining whether the Doppler change is less than or equal to a third pre-defined constant.

6. The method of claim 1, further comprising:
   in response to determining that the tracking initialization condition has been satisfied for a series of sensor data captured at a minimum number of consecutive times including the first time, or that the tracking initialization condition has been satisfied for at least a minimum percentage of sensor data captured during a period of time including the first time:
   determining that the initialization stage is completed; and
   monitoring the at least one target point starting from the second sensor data to form the track of target points.

7. The method of claim 6, further comprising:
   in response to determining that the initialization stage is complete:
   computing the second gating size based on Kalman filter.

8. The method of claim 7, wherein the computing the second gating size based on the Kalman filter comprises:
   generating an elliptical gate based on eccentricity of data points at the first time for capturing the second sensor data.

9. The method of claim 8, further comprising:
   terminating the track of target points in response to determining that:
   observation of a predicted target point has been missed from the generated elliptical gate for at least a minimum number of consecutive times.

10. The method of claim 6, further comprising:
    in response to determining that the tracking initialization condition is not satisfied for at least a maximum number of consecutive times, terminating initialization of the track.

11. A system comprising:
    one or more non-transitory computer-readable storage media embodying instructions; and
    one or more processors coupled to the storage media and operable to execute the instructions to:
    obtain, by a sensor unit placed on a vehicle, first sensor data relating to at least one target point captured at a first time using a first gating size, while the vehicle is traveling along a route;
    determine, from the first sensor data, a first movement parameter associated with the one target point;
    adaptively determine a second gating size based at least in part on the first movement parameter, including computing a Doppler change and a displacement for the target point between a first location of a current time step and a prior location from a previous time step to determine a tracking initialization condition that controls whether tracking of the target point may enter an association stage from an initialization stage; and
    obtain, by the sensor unit placed on the vehicle, second sensor data captured at a second time using the second gating size.

12. The system of claim 11, wherein the one or more processors are operable to execute the instructions to:
   adaptively determine the second gating size by computing the second gating size using the displacement and the Doppler change, and
   determine the first movement parameter associated with the one target point by:
   determining a first set of coordinates representing a first location of the one target point at the first time; and
   determining a first Doppler velocity representing a velocity that the one target point is traveling at the first time.

13. The system of claim 12, wherein the one or more processors are operable to execute the instructions to adaptively determine the second gating size based at least in part on the first movement parameter by:
   retrieving a previously stored set of coordinates representing a prior location of the one target point at a time prior to the first time, and a previously stored Doppler velocity representing a velocity that the one target was traveling at the time prior to the first time;
   computing the displacement between the first location and the prior location based on the first set of coordinates and the previously stored set of coordinates;
   computing the Doppler change based on a difference between the first Doppler velocity and the previously stored Doppler velocity; and
   computing a weighed sum of the displacement and the Doppler change as the second gating size.

14. The system of claim 13, wherein the one or more processors are operable to execute the instructions to determine whether the tracking initialization condition is satisfied based at least in part on the first movement parameter by:
   determining whether the displacement is less than or equal to a sum of the first Doppler velocity weighted by a first pre-defined constant and a second pre-defined constant.

15. The system of claim 13, wherein the one or more processors are operable to execute the instructions to determine whether the tracking initialization condition is satisfied based at least in part on the first movement parameter by:
   determining whether the Doppler change is less than or equal to a third pre-defined constant.

16. The system of claim 11, wherein the one or more processors are operable to execute the instructions further to:
   in response to determining that the tracking initialization condition has been satisfied for a series of sensor data captured at a minimum number of consecutive times including the first time, or that the tracking initialization condition has been satisfied for at least a minimum percentage of sensor data captured during a period of time including the first time:
   determine that the initialization stage is completed; and
   monitor the at least one target point starting from the second sensor data to form the track of target points.

17. The system of claim 16, wherein the one or more processors are operable to execute the instructions further to:
   in response to determining that the initialization stage is complete: compute the second gating size based on Kalman filter.

18. The system of claim 17, wherein the one or more processors are operable to execute the instructions further to compute the second gating size based on the Kalman filter by:
   generating an elliptical gate based on a likelihood distance matrix and a first Doppler velocity at the first time for capturing the second sensor data.

19. The system of claim 18, wherein the one or more processors are operable to execute the instructions further to:
   terminate the track of target points in response to determining that:
   observation of a predicted target point has been missed from the generated elliptical gate for at least a minimum number of consecutive times.

20. The system of claim 16, wherein the one or more processors are operable to execute the instructions further to:
   in response to determining that the tracking initialization condition is not satisfied for at least a maximum number of consecutive times, terminate initialization of the track.

* * * * *